(12) United States Patent
Veilleux, Jr.

(10) Patent No.: US 8,667,803 B2
(45) Date of Patent: Mar. 11, 2014

(54) TURBINE STARTER VALVE

(75) Inventor: Leo Veilleux, Jr., Wethersfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 782 days.

(21) Appl. No.: 12/888,147

(22) Filed: Sep. 22, 2010

(65) Prior Publication Data

US 2012/0067062 A1   Mar. 22, 2012

(51) Int. Cl.
*F02C 7/275* (2006.01)

(52) U.S. Cl.
USPC .......................................................... 60/788

(58) Field of Classification Search
USPC .................. 60/786–788; 251/30.01, 289, 205
See application file for complete search history.

(56) References Cited

U.S. PATENT DOCUMENTS

| | | | | |
|---|---|---|---|---|
| 2,750,737 A * | 6/1956 | Leigh | | 60/39.093 |
| 3,668,013 A | 6/1972 | Franz | | |
| 3,769,998 A * | 11/1973 | Avant | | 137/116.5 |
| 3,795,145 A * | 3/1974 | Miller | | 73/861.53 |
| 4,006,634 A * | 2/1977 | Billette et al. | | 73/861.53 |
| 4,335,738 A * | 6/1982 | Nassir | | 137/246.22 |
| 4,339,916 A | 7/1982 | Burch et al. | | |
| 4,506,690 A | 3/1985 | Mitchell | | |
| 4,617,958 A * | 10/1986 | Seidel et al. | | 137/492.5 |
| 4,702,273 A * | 10/1987 | Allen et al. | | 137/487.5 |
| 5,237,815 A | 8/1993 | McArthur | | |
| 5,315,817 A * | 5/1994 | Vannini et al. | | 60/39.091 |
| 5,463,865 A * | 11/1995 | Smith | | 60/790 |
| 6,684,898 B2 * | 2/2004 | Wiggins et al. | | 137/15.25 |
| 7,335,999 B2 | 2/2008 | Potter et al. | | |
| 7,555,905 B2 | 7/2009 | Borcea | | |
| 7,690,188 B2 | 4/2010 | Schwarz et al. | | |
| 2003/0145603 A1 * | 8/2003 | Reed et al. | | 60/787 |
| 2005/0275224 A1 | 12/2005 | Potter et al. | | |

FOREIGN PATENT DOCUMENTS

EP   0358590 A1   3/1990

* cited by examiner

*Primary Examiner* — Phutthiwat Wongwian
(74) *Attorney, Agent, or Firm* — Cantor Colburn LLP

(57) ABSTRACT

A turbine starter including a valve to modulate an amount of air permitted to flow to a turbine section, a sensor to detect a characteristic of the air at locations defined between the valve and the turbine section and downstream from the turbine section and an electrically powered motor coupled to the valve and the sensor to control the valve to modulate the amount of the air permitted to flow to the turbine section in accordance with the detected characteristic.

17 Claims, 2 Drawing Sheets

TURBINE STARTER VALVE

BACKGROUND OF THE INVENTION

The subject matter disclosed herein relates to a valve for a turbine starter.

Turbine starters include turbines that require a supply of air to operate properly. This air supply is provided via duct work upstream from the turbine through which an air flow pathway is defined. A valve is normally disposed along this pathway for modulating an amount of the air flow permitted to proceed to the turbine. Where more air flow is required, the valve is opened and, where it is necessary to limit the flow, the valve is closed.

The valves for modern turbine starters are typically controlled by pneumatic controllers. These controllers operate on water saturated and contaminated air in icing conditions, which can result in poor reliability and high warranty costs. In addition, the pneumatic actuation of the valve is typically oversized to overcome the icing problem. This increases the weight of the turbine starter and, in an airplane, for example, the added weight may be particularly troublesome.

BRIEF DESCRIPTION OF THE INVENTION

According to an aspect of the invention, a turbine starter is provided and includes a valve to modulate an amount of air permitted to flow to a turbine section, a sensor to detect a characteristic of the air at locations defined between the valve and the turbine section and downstream from the turbine section and an electrically powered motor coupled to the valve and the sensor to control the valve to modulate the amount of the air permitted to flow to the turbine section in accordance with the detected characteristic.

According to another aspect of the invention, a turbine starter is provided and includes a turbine section, a supply duct formed to define an air flow pathway by which air is provided to the turbine section, a valve disposed within the supply duct along the air flow pathway to modulate an amount of the air permitted to flow to the turbine section, a sensor to detect a characteristic of the air at a location defined between the valve and the turbine section and a location defined downstream from the turbine section and an electrically powered motor coupled to the valve and the sensor to control the valve to modulate the amount of the air permitted to flow to the turbine section in accordance with the detected characteristic.

According to yet another aspect of the invention, a turbine starter is provided and includes a turbine section, a supply duct formed to define an air flow pathway by which air is provided to the turbine section, a valve disposed within the supply duct along the air flow pathway to modulate an amount of the air permitted to flow to the turbine section, a static pressure sensor disposed downstream from the valve and upstream from the turbine section to detect a pressure of the air upstream from the turbine section, an ambient pressure sensor disposed downstream from or at the turbine section to detect an ambient pressure of the air and an electrically powered motor coupled to the valve, the sensor and the ambient pressure sensor to control the valve to modulate the amount of the air permitted to flow to the turbine section in accordance with a pressure drop across the turbine section, which is associated with the detected pressure upstream from the turbine section and the detected ambient pressure, and in accordance with feedback control.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
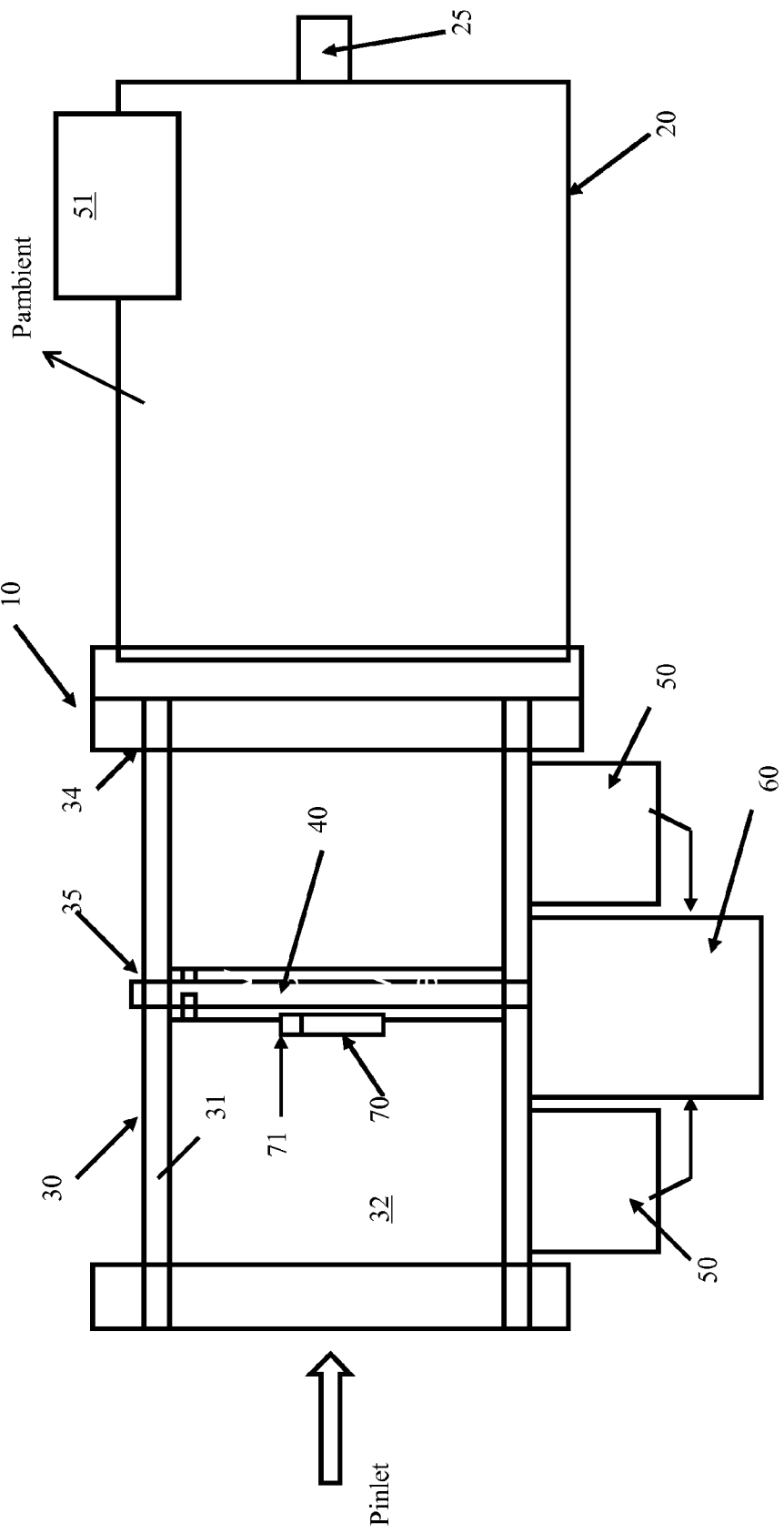
FIG. 1 is a schematic view of a turbine starter.
Figure 2:
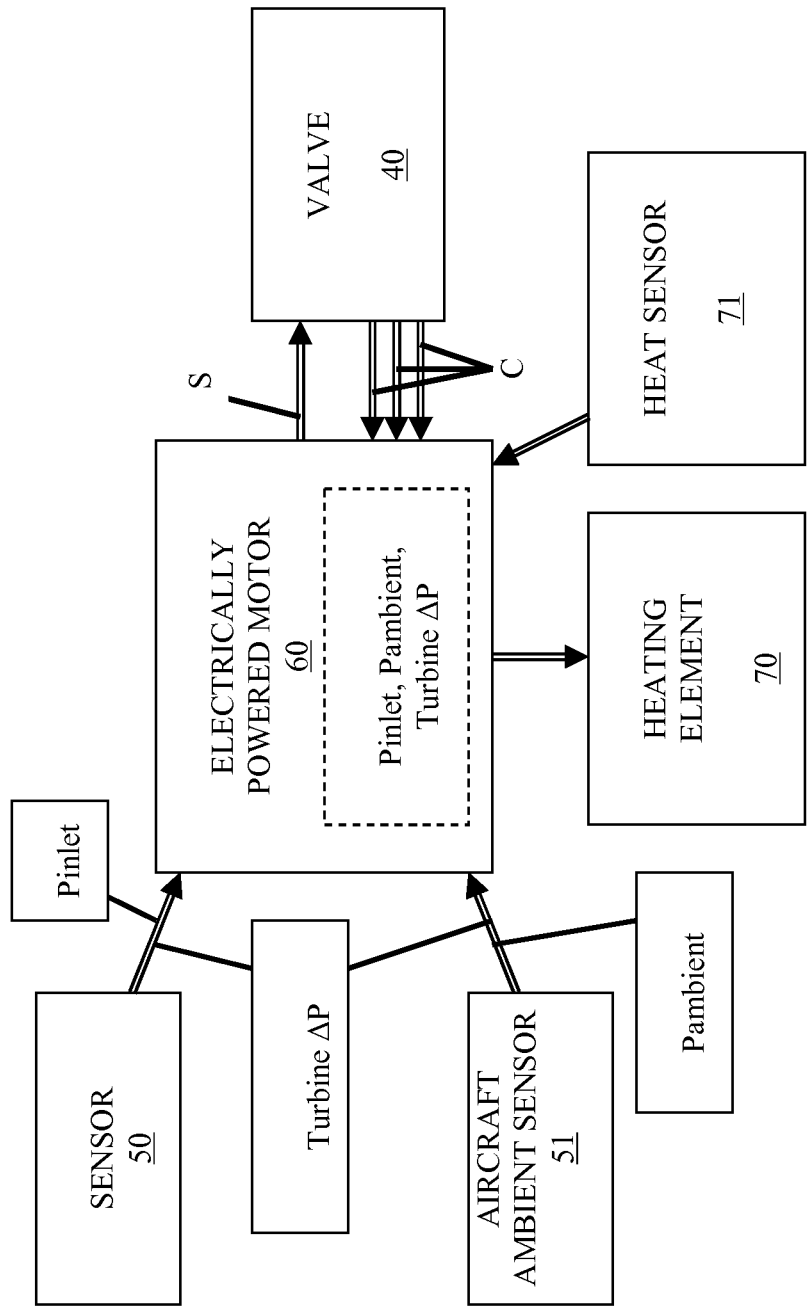
FIG. 2 is a schematic diagram of an electrically powered motor to control at least a valve of the turbine starter.

With reference to FIGS. 1 and 2, a turbine starter 10 is provided and includes a turbine section 20, a supply duct 30, a valve 40, a sensor 50 and an electrically powered motor 60. The turbine section 20 includes a turbine that rotates about a rotor centerline to drive rotation of a shaft 25, which is coupled to an engine gearbox at a front end of the turbine section 20. The supply duct 30 is disposed upstream from and in fluid communication with the turbine section 20 and includes a peripheral wall 31 that is formed to define an air flow pathway 32 by which air is provided from an inlet to the turbine section 20. The air may be supplied from various sources, including, but not limited to, an aircraft air supply.

The supply duct 30 further includes a mounting flange 34, by which the supply duct 30 and the turbine section 20 are fluidly coupled to one another, and a valve mounting 35 on which the valve 40 is mounted. The valve 40 is therefore disposed within the supply duct 30 and along the air flow pathway 32. In this position, the valve 40 may be opened and closed to thereby modulate an amount of the air that is permitted to flow to the turbine section 20. That is, if the flow of the air needs to be reduced, the valve 40 may be wholly or partially closed and, if the flow of the air needs to be increased, the valve 40 may be wholly or partially opened. The valve 40 may be any type of valve including, but not limited to, a butterfly valve or a similar type of valve. In addition, as will be discussed below, the valve 40 may be controllable in accordance with multiple types of control algorithms.

The sensor 50 detects a characteristic of the air to be supplied to the turbine section. The sensor 50 may include a pressure sensor and, in some embodiments, may include a static pressure sensor, a dynamic pressure sensor and/or a dynamic total pressure sensor with, in accordance with further embodiments, a piezoresistive sensor diaphragm. The sensor 50 may be disposed in one more of various locations, such as a location upstream from the valve 40, a location downstream from the valve 40 and upstream from the turbine section 20 and/or a location downstream from or at the turbine section 20 where the sensor may include an aircraft ambient pressure sensor 51 as an example. The sensor 50 may be provided as a single component at any of these locations or as multiple sensors 50 at these locations. Moreover, the sensor 50 may be provided as multiple sensors 50 at each of these locations. That is there may be one or more sensors 50 at one or more of the locations.

In accordance with further embodiments, where the turbine starter 10 is provided for use with an aircraft, the sensor 50 may be disposed downstream from the valve 40 and upstream from the turbine section 20 with the aircraft ambient sensor 51 provided downstream from or at the turbine section 20. Here, the aircraft ambient pressure sensor 51 may be a temperature/pressure sensor already provided on the aircraft such that additional of an additional component is not necessary.

The electrically powered motor 60 may include a motor a logic controller and motor control and is coupled to and disposed in signal communication with the valve 40. The electrically powered motor 60 is further coupled to and disposed in signal communication with the sensor 50. As such, the electrically powered motor 60 is configured to control the valve 40 to open and close in order to cause the valve 40 to modulate the amount of the air permitted to flow to the turbine section 20 in accordance with at least the detected characteristic.

That is, where the detected characteristic is a pressure of the air, the electrically powered motor 60 may receive input data reflective of air pressure at the supply duct inlet, Pinlet, and ambient pressure, Pambient, for the turbine section 20 output. The ambient pressure, Pambient, may be determined by the sensor 50, aircraft data, engine data and/or a delta pressure transducer disposed across the turbine. In this way, turbine pressure downstream from the turbine section 20 and upstream from the turbine section 20 can be employed to determine a turbine pressure drop across the turbine section 20 for which turbine starter torque and speed can be controlled so that the turbine section 20 can by operated within normal parameters for the current condition.

If the air pressure at the supply duct inlet, Pinlet, is low relative to the ambient pressure, Pambient, such that the turbine pressure drop is correspondingly low, the electrically powered motor 60 could output a control signal, S, to the valve 40 that instructs or causes the valve 40 to open to thereby allow more air to pass to the turbine section 20. In this way, the appropriate turbine pressure drop, which is associated with the air pressure at the supply duct inlet, Pinlet, and the ambient pressure, Pambient, and which may be regarded as a target pressure, could be achieved within a predefined response period. By contrast, the electrically powered motor 60 could also close the valve 40 in a similar manner if the air pressure at the supply duct inlet, Pinlet, is determined to be too high relative to the ambient pressure, Pambient.

The electrically powered motor 60 may operate according to a single control channel as described above or with multiple control channels with one or more being a feedback control channel, C, defined between for example the valve 40 and the electrically powered motor 60. With the feedback control channel, C, a position of the valve 40 can be adjusted in real-time based upon continually measured changes in the detected characteristic and the observed efficiency of the valve 40 at particular positions. That is, if it is observed that valve 40 closure is not sufficient or is not occurring rapidly enough in order to decrease air supply to the turbine section 20 by the necessary amount, the electrically powered motor 60 could adjust valve 40 position or could instruct the valve 40 to close more rapidly.

The electrically powered motor 60 may be formed, for example, as a 28 volt motor that derives its power supply from an aircraft power supply. The electrically powered motor 60 may be a brushless motor, a permanent magnet motor or any similar type of motor.

The turbine starter may further include a heating element 70 and a heat sensor 71 disposed on or proximate to the valve 40. The heating element 70 may be a resistive element or, more particularly, a heater operably coupled to and controlled by the electrically powered motor 60. This allows a temperature or a frozen state of a valve 40 to be detected and communicated by the heat sensor 71 and further allows the frozen valve 40 to be heated and unfrozen in accordance with control of the heating element 70 by the electrically powered motor 60. The unfrozen valve 40 can be operated thereby without the energy loss of a constant leak when not operating or preheating. The heating element 70 and the heat sensor 71 allows for a use of a lower HP electrically powered motor 60 than would otherwise be possible.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbine starter, comprising:
a valve to modulate an amount of air permitted to flow to a turbine section;
a plurality of sensors respectively disposed to detect a characteristic of the air at locations defined between the valve and the turbine section and downstream from the turbine section;
an electrically powered motor coupled to the valve and the plurality of sensors to control the valve to modulate the amount of the air permitted to flow to the turbine section in accordance with the detected characteristics;
a heating element disposed on the valve; and
a heat sensor disposed on the valve to detect a temperature of the valve, the heating element and the heat sensor each being operably coupled to the electrically powered motor.

2. The turbine starter according to claim 1, wherein the plurality of sensors comprises a static pressure sensor, a dynamic pressure sensor, a dynamic total pressure sensor and/or an aircraft ambient pressure sensor.

3. The turbine starter according to claim 1, wherein the plurality of sensors comprises a pressure sensor disposed between the valve and the turbine section and an aircraft ambient pressure sensor disposed downstream from or at the turbine section.

4. The turbine starter according to claim 1, wherein the electrically powered motor controls the valve in accordance with the detected characteristic and a target value for the characteristic.

5. The turbine starter according to claim 1, wherein the electrically powered motor controls the valve in accordance with the detected characteristic, a target value for the characteristic and feedback control.

6. The turbine starter according to claim 1, wherein the heating element comprises a resistive element operably coupled to and controlled by the electrically powered motor.

7. A turbine starter, comprising:
a turbine section;
a supply duct formed to define an air flow pathway by which air is provided to the turbine section;

a valve disposed within the supply duct along the air flow pathway to modulate an amount of the air permitted to flow to the turbine section;

a plurality of sensors respectively disposed to detect a characteristic of the air at a location defined between the valve and the turbine section and a location defined downstream from the turbine section;

an electrically powered motor coupled to the valve and the plurality of sensors to control the valve to modulate the amount of the air permitted to flow to the turbine section in accordance with the detected characteristic;

a heating element disposed on the valve; and a heat sensor disposed on the valve to detect a temperature of the valve, the heating element and the heat sensor each being operably coupled to the electrically powered motor.

8. The turbine starter according to claim 7, wherein the supply duct comprises a valve mounting upstream from the turbine section on which the valve is mounted.

9. The turbine starter according to claim 7, wherein the valve comprises a butterfly valve.

10. The turbine starter according to claim 7, wherein the plurality of sensors comprises a static pressure sensor, a dynamic pressure sensor and/or a dynamic total pressure sensor.

11. The turbine starter according to claim 7, wherein the plurality of sensors comprises a pressure sensor disposed between the valve and the turbine section.

12. The turbine starter according to claim 11, wherein the plurality of sensors further comprises an aircraft ambient pressure sensor disposed downstream from or at the turbine section.

13. The turbine starter according to claim 7, wherein the electrically powered motor controls the valve in accordance with the detected characteristic and a target value for the characteristic.

14. The turbine starter according to claim 7, wherein the electrically powered motor controls the valve in accordance with the detected characteristic, a target value for the characteristic and feedback control.

15. The turbine starter according to claim 7, wherein the heating element comprises a resistive element operably coupled to and controlled by the electrically powered motor.

16. A turbine starter, comprising:

a turbine section;

a supply duct formed to define an air flow pathway by which air is provided to the turbine section;

a valve disposed within the supply duct along the air flow pathway to modulate an amount of the air permitted to flow to the turbine section;

a static pressure sensor disposed downstream from the valve and upstream from the turbine section to detect a pressure of the air upstream from the turbine section;

an ambient pressure sensor disposed downstream from or at the turbine section to detect an ambient pressure of the air;

an electrically powered motor coupled to the valve, the static pressure sensor and the ambient pressure sensor to control the valve to modulate the amount of the air permitted to flow to the turbine section in accordance with a pressure drop across the turbine section, which is associated with the detected pressure upstream from the turbine section and the detected ambient pressure, and in accordance with feedback control;

a heating element disposed on the valve; and a heat sensor disposed on the valve to detect a temperature of the valve, the heating element and the heat sensor each being operably coupled to the electrically powered motor.

17. The turbine starter according to claim 16, wherein the heating element comprises a resistive element operably coupled to and controlled by the electrically powered motor.

* * * * *